United States Patent

[11] 3,584,670

| | | | | |
|---|---|---|---|---|
| [72] | Inventor | Henri Verdier Beauregard-L'Eveque, France | | |
| [21] | Appl. No. | 803,357 | | |
| [22] | Filed | Feb. 28, 1969 | | |
| [45] | Patented | June 15, 1971 | | |
| [73] | Assignee | Compagnie Generale Des Etablissements Michelin, raison Sociale Michelin & Cie Clermont-Ferrand (Puy-de-Dome), France | | |
| [32] | Priority | Mar. 4, 1968 | | |
| [33] | | France | | |
| [31] | | 142,326 | | |

[54] PNEUMATIC TIRE
7 Claims, 2 Drawing Figs.

[52] U.S. Cl. ............................................. 152/209
[51] Int. Cl. ....................................... B60c 11/00
[50] Field of Search ............................. 152/209

[56] References Cited
UNITED STATES PATENTS
| | | | |
|---|---|---|---|
| 2,000,785 | 5/1935 | Nellen et al. ................... | 152/209 |
| 3,373,790 | 3/1968 | Newman et al. .............. | 152/209 |

*Primary Examiner*—James B. Marbert
*Attorney*—Brumbaugh, Graves, Donohue & Raymond

ABSTRACT: A heavy-duty road tire of the radial type is formed with a substantially flat transverse profile. The tire has a tread formed with substantially parallel zigzag grooves, each extending obliquely from one edge of the tread to the other. The zigzag grooves are closer together at the center of the tread than at the edges of the tread and are connected by additional grooves.

INVENTOR.
HENRI VERDIER

PNEUMATIC TIRE

BACKGROUND OF THE INVENTION

This invention relates to pneumatic tires and, more particularly, to novel and highly effective treads for heavy-duty road tires of the radial type.

Customarily, tires of the radial type for heavy-duty road vehicles comprise a tread molding having several wavy or zigzag circumferential grooves which divide the tread into ring-shaped continuous bands of substantially equal width. A recent improvement consisted in bringing the moldings closer to the center plane of longitudinal section while keeping the sides of the tread more massive, so as to resist better the wear and tear which, in a tire of the radial type, affects predominantly the edges and not the center of the tread.

SUMMARY OF THE INVENTION

An object of the invention is to provide improved characteristics of wear and tear and adhesion of the tread of radial-type tires for heavy-duty road vehicles by means of a completely different arrangement of the tread moldings adapted specifically to a tread having flat cross-sectional profile.

In general, tire treads have a curved transverse profile, and the radius of curvature of a meridian cross section of the surface of the tread is smaller than the radius of curvature of a longitudinal cross section. In accordance with the present invention, in contrast, a tread is provided that has a flat transverse profile: i.e., that has a meridian radius of curvature which is larger than the longitudinal radius of curvature.

The tire tread in accordance with the invention is formed with substantially parallel zigzag grooves characterized by the following features.

a. The grooves extend with substantially uniform width from one edge of the tread to the other.
b. The grooves extend in an oblique direction: i.e., with an inclination ranging from 30° to 60°, being preferably close to 45°, with respect to the longitudinal direction.
c. The grooves are separated from one another at the edges of the tread by a distance P and in the center of the tread by a distance substantially equal to P/2, such distances being measured parallel to the longitudinal direction, P being within the range of L/3 to ⅔L, and being preferably close to L/2, L being the width of the tread.

In accordance with one preferred arrangement, the ridges formed in the tread between consecutive zigzag grooves have their wide portions divided by additional grooves which are oblique and connect the zigzag grooves. One can also provide for narrow connecting grooves, for example in the center of the tread.

In accordance with a second preferred arrangement, the depth of the zigzag grooves of the tread increases from the middle of the tread in a direction towards each of the edges of the tread.

Fine incisions may be provided in the raised portions of the tread and/or on the edges of these portions.

BRIEF DESCRIPTION OF THE DRAWING

An understanding of additional aspects of the invention may be gained from a consideration of the following detailed description of several representative embodiments thereof, in conjunction with the accompanying figures of the drawing, wherein.

DESCRIPTION OF THE PREFERRED EMBODIMENTS

Figure 1:
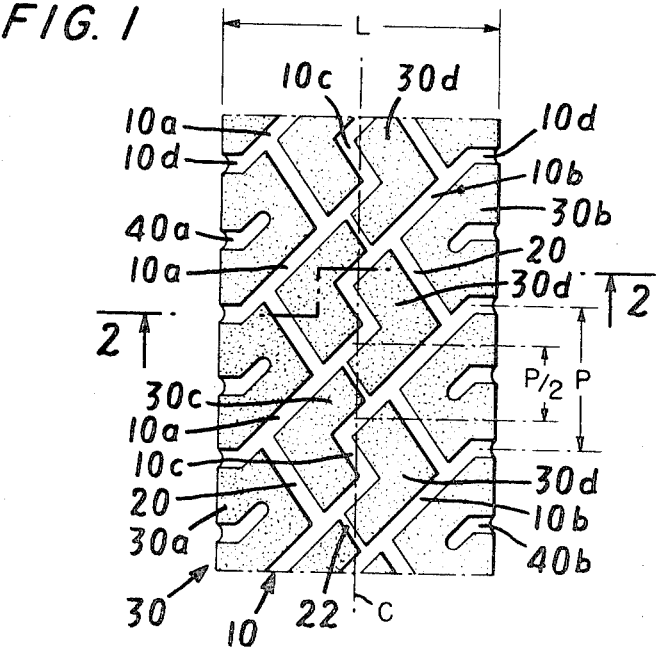
FIG. 1 is a developed plan view of a preferred embodiment of a tire tread made in accordance with the invention.
Figure 2:
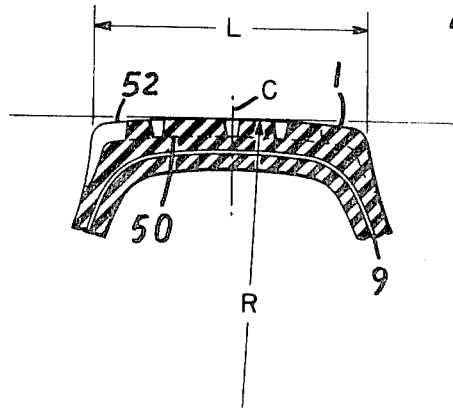
FIG. 2 is a sectional view of the tread through the line II-II in FIG. 1 and looking in the direction of the arrows.

FIGS. 1 and 2 show a tread 1 of a heavy-duty radial tire for road service. The size of the tire is 12.00×20, and the tread has a width L measuring 248 mm.

The figures show a tire having a radial carcass 9 and a tread having an indefinite succession of parallel grooves 10 each comprising a number of segments. Each of two of the segments 10a and 10b forms an angle of approximately 45° with the longitudinal direction shown by a centerline C. The segments 10a and 10b are connected to one another at their adjacent ends by an oppositely inclined segment 10c forming an angle of approximately 36° with respect to the longitudinal direction and at their opposite ends intersect transverse segments 10d. The pitch P of the grooves 10, i.e., the circumferential distance between consecutive grooves, is 128 mm., i.e., approximately half of the width L of the tread. However, in their center parts, the grooves 10 have a distance from one another of only P/2, owing to their zigzag form.

Adjacent grooves 10 are connected to each other by wide lateral connecting grooves 20 and by a narrow center connecting groove 22. The grooves 20 and 22 are parallel to the segment 10c and divide the ridge 30 formed between adjacent grooves 10. The ridge 30 is divided in its wide portion so as to form blocks 30a and 30b and also in its narrow portion so as to form from the elongated center block two adjacent blocks 30c and 30d. Additional grooves 40a and 40b are provided in order to open up the massive blocks 30a and 30b.

FIG. 2 shows the transverse profile of the tread. The transverse radius of curvature R is 744 mm. while the longitudinal radius of curvature is approximately 550 mm. The transverse profile is essentially flat. It can be seen from the broken line 50, indicating the bottom of the grooves 10, and the line 52, indicating the transverse profile of the tread, that the depth of the grooves 10 increases in the direction from the center towards the edge. The depth varies from 13.7 mm. to approximately 16.4 mm., i.e., 20 percent. This arrangement promotes the draining of the tread when it rolls over a wet road.

The provision of a tread having a flat transverse profile and oblique grooves which are continuous from edge to edge and widely separated at the edges while being closer to one another in the center of the tire greatly improves the characteristics of the tire. The structure provides a molding formed of a polygonal elements that are massive at the edges and less massive in the center, thus favoring good resistance to wear and tear and good adhesion. Good drainage of the tread is provided by means of the grooves which are continuous from edge to edge.

Thus, there is provided in accordance with the invention a novel and highly effective heavy-duty road tire.

Many modifications of the representative embodiments described above will readily occur to those skilled in the art, and the invention is to be construed as including all such modifications that are within the scope of the appended claims.

I claim:

1. A tire formed with a substantially flat transverse profile and comprising a tread formed with substantially parallel edge-connecting grooves having circumferentially spaced, mutually offset segments, each of said edge-connecting grooves extending from one edge of said tread to the other and forming an angle with respect to the longitudinal direction of said tire within the range of 30° to 60°, adjacent ones of said edge-connecting grooves being separated from each other at the edges of said tread a distance P and at the center of said tread a distance substantially equal to P/2, said distances being measured parallel to said longitudinal direction and P being within the range of L/3 to 2L/3, L being the width of said tread.

2. A tire according to claim 1 wherein said angle is substantially 45°.

3. A tire according to claim 1 wherein P is substantially L/2.

4. A tire according to claim 1 comprising additional grooves dividing the ridges between adjacent edge-connecting grooves.

5. A tire according to claim 4 wherein said additional grooves divide said ridges at the widest portions thereof.

6. A tire according to claim 1 wherein the depth of said edge-connecting grooves increases in a direction from the center towards each edge.

7. A tire according to claim 1 wherein said tire is a heavy-duty road tire and further comprising a carcass having radial cords.